(12) United States Patent
Kim et al.

(10) Patent No.: US 12,141,257 B2
(45) Date of Patent: Nov. 12, 2024

(54) VEHICLE AND FINGERPRINT AUTHENTICATION METHOD OF THE VEHICLE

(71) Applicants: HYUNDAI MOTOR COMPANY, Seoul (KR); KIA CORPORATION, Seoul (KR)

(72) Inventors: Taeseung Kim, Incheon (KR); Dong June Song, Anyang-si (KR); Jihye Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 283 days.

(21) Appl. No.: 17/538,674

(22) Filed: Nov. 30, 2021

(65) Prior Publication Data

US 2022/0269760 A1    Aug. 25, 2022

(30) Foreign Application Priority Data

Dec. 28, 2020    (KR) .................. 10-2020-0185008

(51) Int. Cl.
*G06F 21/32* (2013.01)
*B60R 25/04* (2013.01)
*B60R 25/25* (2013.01)

(52) U.S. Cl.
CPC .............. *G06F 21/32* (2013.01); *B60R 25/04* (2013.01); *B60R 25/252* (2013.01)

(58) Field of Classification Search
CPC ........ G06F 21/32; B60R 25/04; B60R 25/252
See application file for complete search history.

(56) References Cited

U.S. PATENT DOCUMENTS

| | | | |
|---|---|---|---|
| 6,633,090 B2* | 10/2003 | Harter ................. | B60R 25/252 307/10.6 |
| 2007/0292006 A1* | 12/2007 | Johnson ............... | G06Q 20/40 705/44 |
| 2010/0060412 A1* | 3/2010 | Johnson ............... | B60R 25/04 340/5.53 |
| 2014/0156149 A1* | 6/2014 | Feit .................... | G06V 40/10 701/1 |
| 2015/0102898 A1* | 4/2015 | Huennekens .......... | B60R 25/24 340/5.6 |

(Continued)

*Primary Examiner* — Azizul Choudhury
(74) *Attorney, Agent, or Firm* — MCDONNELL BOEHNEN HULBERT & BERGHOFF LLP

(57) ABSTRACT

The disclosure relates to a vehicle and a fingerprint authentication method of the vehicle, and is aimed to enable a user to more conveniently perform user authentication through concretization of a fingerprint authentication process. The vehicle according to the disclosure includes a start button configured to start an engine; and a fingerprint recognition module including a fingerprint sensor provided in a portion of the start button and configured to recognize a user's fingerprint for fingerprint authentication, the fingerprint recognition module configured to perform service interworking authentication for using a service provided in the vehicle and fingerprint recognition starting authentication for starting the engine, and process the service interworking authentication when a request for the service interworking authentication and a request for the fingerprint recognition starting authentication are issued at the same time.

16 Claims, 5 Drawing Sheets

(56) References Cited

U.S. PATENT DOCUMENTS

| | | | |
|---|---|---|---|
| 2015/0217726 A1* | 8/2015 | Lee | B60R 25/252 |
| | | | 701/1 |
| 2016/0185358 A1* | 6/2016 | Todasco | A61B 5/6893 |
| | | | 701/48 |
| 2016/0244023 A1* | 8/2016 | Masucci | G07C 9/00563 |
| 2016/0300242 A1* | 10/2016 | Truong | G01S 19/13 |
| 2017/0032168 A1* | 2/2017 | Kim | H04L 63/0861 |
| 2019/0066424 A1* | 2/2019 | Hassani | B60R 25/252 |
| 2020/0114876 A1* | 4/2020 | Ohta | B60R 25/252 |

\* cited by examiner

FIG. 4

| | AUTHENTICATION STAGE | AUTHENTICATION STAGE |
|---|---|---|
| CASE #1 | AFTER FINGERPRINT AUTHENTICATION FOR FINGERPRINT RECOGNITION STARTING | "PRESS THE START BUTTON IN 30 SECONDS TO START" |
| CASE #2 | WHEN USER PRESSES START BUTTON WITHOUT POSSESSING SMART KEY IN B+ MODE | "SMART KEY IS NOT RECOGNIZED" |
| CASE #3 | WHEN USER PRESSES START BUTTON ONCE MORE IN SITUATION OF CASE #2 (COMBINATION OF DIGITAL KEY & FINGERPRINT AUTHENTICATION) | "DIRECTLY PRESS THE START BUTTON WITH THE SMART KEY" "AUTHENTICATE THE DIGITAL KEY OR AUTHENTICATE WITH THE REGISTERED FINGERPRINT" |
| CASE #4 | WHEN USER PRESSES START BUTTON ONCE MORE IN SITUATION OF CASE #2 (FINGERPRINT AUTHENTICATION) | "PRESS THE START BUTTON AFTER AUTHENTICATING THE REGISTERED FINGERPRINT" |
| CASE #5 | WHEN CONVERSION FROM REMOTE STARTING TO NORMAL STARTING OCCURS | "THE ENGINE WILL BE OFF AFTER A WHILE. PLEASE AUTHENTICATE YOUR FINGERPRINT" |
| CASE #6 | WHEN USER TOUCHES FINGERPRINT SENSOR WITH FINGER AFTER FINGERPRINT RECOGNITION IS LIMITED | "LIMITED FINGERPRINT AUTHENTICATION, PLEASE TRY AGAIN AFTER A MINUTE" |
| CASE #7 | WHEN FINGERPRINT RECOGNITION IS SUCCESSFUL | "SUCCESSFUL AUTHENTICATION. YOU CAN START THE ENGINE" |

VEHICLE AND FINGERPRINT AUTHENTICATION METHOD OF THE VEHICLE

CROSS-REFERENCE TO RELATED APPLICATION

This application claims the benefit of Korean Patent Application No. 10-2020-0185008, filed on Dec. 28, 2020 in the Korean Intellectual Property Office, the disclosure of which is incorporated herein by reference.

BACKGROUND

1. Field

Embodiments of the disclosure relate to a vehicle, and more particularly, to a fingerprint authentication method of a vehicle.

2. Description of the Related Art

To use a vehicle, a user should start the engine after sitting in the vehicle. A starting method of inserting a physical key into a key box and then turning the physical key to a designated position to start the engine is changing to a starting method of starting the engine only by pressing a start button. To start the engine by using the start button, a user should press the start button in the state in which a FOB (a smart key or digital key) exists inside the vehicle.

With the development of communication technology and digital devices, many users conduct electronic commerce (e-commerce) or financial services inside vehicles. To conduct electronic commerce or financial services, user authentication is needed. However, it is inconvenient that such user authentication requires inputs of a user ID, a password, etc.

SUMMARY

Therefore, an aspect of the disclosure is aimed to enable a user to more conveniently perform user authentication through concretization of a fingerprint authentication process.

Additional aspects of the disclosure will be set forth in part in the description which follows and, in part, will be obvious from the description, or may be learned by practice of the disclosure.

For the above-described object, a vehicle according to an embodiment of the disclosure includes: a start button configured to start an engine, and a fingerprint recognition module including a fingerprint sensor configured to recognize a user's fingerprint for fingerprint authentication, the fingerprint recognition module configured to perform service interworking authentication for using a service provided in the vehicle and fingerprint recognition starting authentication for starting the engine, and preferentially process the service interworking authentication when a request for the service interworking authentication and a request for the fingerprint recognition starting authentication are issued at the same time.

In the vehicle, when a request for the service interworking authentication is issued in a standby state for the fingerprint recognition starting authentication, the fingerprint recognition module may first perform the service interworking authentication and then return to the standby state for the fingerprint recognition starting authentication.

In the vehicle, the service interworking authentication may be authentication for performing personalized profile interworking in the vehicle.

In the vehicle, the service interworking authentication may be authentication for performing a valet mode release in the vehicle.

In the vehicle, the service interworking authentication may be authentication for performing payment for electronic commerce in the vehicle.

In the vehicle, the fingerprint recognition module may transmit a result of a success/failure of fingerprint authentication for the service interworking authentication to a multimedia device of the vehicle, and transmit a result of a success of fingerprint authentication for the fingerprint recognition starting authentication to an authentication controller of the vehicle.

In the vehicle, when a power supply mode of the vehicle is converted to a first mode B+ by a control of the start button, the fingerprint recognition starting authentication may be activated and the service interworking authentication may be deactivated.

In the vehicle, when a power supply mode of the vehicle is converted to a second mode ACC or a third mode ON by a control of the start button, both the service interworking authentication and the fingerprint recognition starting authentication may be activated.

In the vehicle, when a power supply mode of the vehicle is converted to a fourth mode START by a control of the start button, the service interworking authentication may be activated and the fingerprint recognition starting authentication may be deactivated.

For the above-described object, a fingerprint authentication method of a vehicle according to an embodiment of the disclosure, the vehicle including a start button configured to start an engine, and a fingerprint recognition module including a fingerprint sensor configured to recognize a user's fingerprint for fingerprint authentication, includes: performing service interworking authentication for using a service provided in the vehicle and fingerprint recognition starting authentication for starting the engine; and preferentially processing the service interworking authentication when a request for the service interworking authentication and a request for the fingerprint recognition starting authentication are issued at the same time.

The fingerprint authentication method may further include that when a request for the service interworking authentication is issued in a standby state for the fingerprint recognition starting authentication, first performing the service interworking authentication and then returning to the standby state for the fingerprint recognition starting authentication.

In the fingerprint authentication method, the service interworking authentication may be authentication for performing personalized profile interworking in the vehicle.

In the fingerprint authentication method, the service interworking authentication may be authentication for performing a valet mode release in the vehicle.

In the fingerprint authentication method, the service interworking authentication may be authentication for performing payment for electronic commerce in the vehicle.

The fingerprint authentication method may further include transmitting a result of a success/failure of fingerprint authentication for the service interworking authentication to a multimedia device of the vehicle, and transmitting a result of a success of fingerprint authentication for the fingerprint recognition starting authentication to an authentication controller of the vehicle.

The fingerprint authentication method may further include, when a power supply mode of the vehicle is converted to a first mode B+ by a control of the start button, activating the fingerprint recognition starting authentication and deactivating the service interworking authentication.

The fingerprint authentication method may further include, when a power supply mode of the vehicle is converted to a second mode ACC or a third mode ON by a control of the start button, activating both the service interworking authentication and the fingerprint recognition starting authentication.

The fingerprint authentication method may further include, when a power supply mode of the vehicle is converted to a fourth mode START by a control of the start button, activating the service interworking authentication and deactivating the fingerprint recognition starting authentication.

For the above-described object, a vehicle according to another embodiment of the disclosure includes a start button configured to start an engine, and a fingerprint recognition module including a fingerprint sensor configured to recognize a user's fingerprint for fingerprint authentication, the fingerprint recognition module configured to perform service interworking authentication for using a service provided in the vehicle and fingerprint recognition starting authentication for starting the engine, wherein, when a request for the service interworking authentication is issued in the standby state for the fingerprint recognition starting authentication, the fingerprint recognition module first performs the service interworking authentication and then returns to the standby state for the fingerprint recognition starting authentication.

For the above-described object, a fingerprint authentication method of a vehicle according to another embodiment of the disclosure, the vehicle including a start button configured to start an engine, and a fingerprint recognition module including a fingerprint sensor configured to recognize a user's fingerprint for fingerprint authentication, includes performing service interworking authentication for using a service provided in the vehicle and fingerprint recognition starting authentication for starting the engine, and first performing the service interworking authentication and then returning to a standby state for the fingerprint recognition starting authentication, when a request for the service interworking authentication is issued in the standby state for the fingerprint recognition starting authentication.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 shows various embodiments of guidance messages that are output in fingerprint authentication and related operations of a vehicle according to an embodiment of the disclosure.

DETAILED DESCRIPTION

Figure 1:
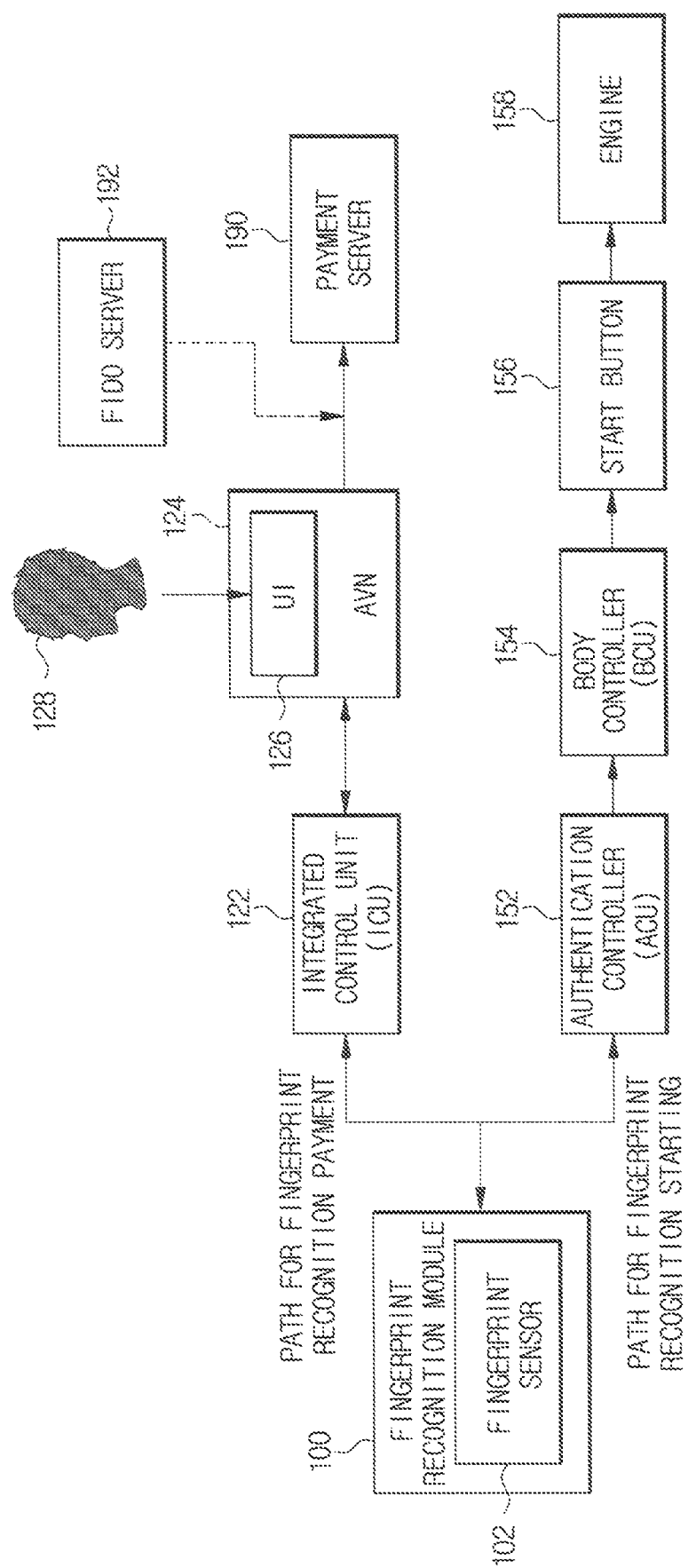
FIG. 1 shows a control system of a fingerprint recognition module of a vehicle according to an embodiment of the disclosure.

FIG. 1 shows a control system of a fingerprint recognition module of a vehicle according to an embodiment of the disclosure. In FIG. 1, a payment server 190 and an on-line biometric authentication server 192 may be provided in a remote region, not in the vehicle, to communicate with an Audio Video Navigation (AVN; multimedia device) 124 of the vehicle through a wireless communication network.

As shown in FIG. 1, the vehicle according to an embodiment of the disclosure may include a fingerprint recognition module 100. The fingerprint recognition module 100 may include a fingerprint sensor 102. Also, the fingerprint recognition module 100 may further include a storage device (not shown) storing fingerprint registration information registered by a user 128. In the vehicle according to an embodiment of the disclosure, a plurality of tasks including fingerprint recognition payment, a personalized profile, a valet mode release, and fingerprint recognition starting may be performed by using a result of fingerprint recognition performed through the fingerprint recognition module 100. The fingerprint recognition payment may be to perform electronic commerce or financial services through user authentication using fingerprint recognition. The electronic commerce may include an order, payment, order confirmation, etc. The financial services may include fund transfer, transaction details confirmation, exchange, payment, etc. The personalized profile may be to set, when a plurality of drivers share one vehicle, a personalized profile for each driver to set angles of side mirrors, an angle of a room mirror, a display position of a head-up display, a cluster, an AVN screen, a driving mode, a navigation, a radio frequency, a room mood lamp, welcome sound, a Bluetooth connection, etc. for the driver. When a married couple shares a vehicle, a personalized profile for an individual may be applied by setting a personalized profile for a husband and a personalized profile for a wife individually and authenticating the husband or wife through fingerprint recognition. Also, a one-time password may be temporarily applied for valet parking in a restaurant, a hotel, etc. to allow a valet parking manager to temporarily drive a vehicle. When valet parking is completed, the one-time password may be disabled to prevent another person except for a registered user from driving the vehicle. Fingerprint recognition may be used to release valet parking. Fingerprint recognition starting may enable an authenticated user to start the engine of a vehicle by performing user authentication through fingerprint recognition.

In FIG. 1, two task paths of fingerprint recognition payment and fingerprint recognition starting are shown. The path for fingerprint recognition payment may include the fingerprint recognition module 100, an integrated control unit 122, an AVN 124, a user (driver) 128, a payment server 190, and an on-line biometric authentication server 192. The path for fingerprint recognition starting may include the fingerprint recognition module 100, an authentication controller 152, a body controller 154, a start button 156, and an engine 158.

In the path for fingerprint recognition payment, the fingerprint recognition module 100 may include the fingerprint sensor 102. The fingerprint sensor 102 may detect, when the user 128 contacts the fingerprint sensor 102 with his/her finger, a fingerprint of the finger. The fingerprint recognition module 100 may convert information about the fingerprint detected by the fingerprint sensor 102 into digital data. The fingerprint recognition module 100 may store fingerprint information registered by the user 128, and compare the information about the fingerprint detected by the fingerprint sensor 102 with the registered fingerprint information to perform fingerprint authentication. The fingerprint authentication performed by the fingerprint recognition module 100 may be a task of determining whether the corresponding fingerprint is identical to a fingerprint registered in advance in the fingerprint recognition module 100. The fingerprint sensor 102 may be a capacitive sensor.

The integrated control unit 122, which is a controller to control overall communications of the vehicle, is also called an ICU. In an embodiment of the disclosure, the integrated control unit 122 may communicate with the fingerprint recognition module 100 by a B-CAN method to transmit/receive data related to fingerprint recognition and authentication. Communications between the fingerprint recognition module 100 and the integrated control unit 122 may be conducted in an encryption state. Also, the integrated control unit 122 may transmit information received from the fingerprint recognition module 100 to the AVN 124. Communications between the integrated control unit 122 and the AVN 124 may be conducted by the Ethernet. In this case, the communications between the integrated control unit 122 and the AVN 124 may be also conducted in an encryption state.

The AVN 124 may perform basically a multimedia function and a navigation function. In an embodiment of the disclosure, the AVN 124 may display a user interface 126 related to fingerprint registration and fingerprint recognition payment to enable the user 128 to input information related to fingerprint registration and fingerprint recognition payment or confirm related information. For example, the AVN 124 may display a guidance screen or user input screens required for registering/deleting a fingerprint upon fingerprint registration, through the user interface 126. Also, the AVN 124 may display, upon fingerprint recognition payment, a guidance screen or user input screens required for fingerprint recognition payment, through the user interface 126. The user 128 may obtain necessary information through a guidance screen that is displayed through the user interface 126 of the AVN 124, and input necessary information (a selection) through a user input screen.

The payment server 190 may be a device for processing fingerprint recognition payment requested by the user 128 in the vehicle. For security, the payment server 190 may receive payment information including authentication information from the AVN 124.

The on-line biometric authentication server 192, which is a Fast Identity Online (FIDO) server, may perform personal authentication by using biometric recognition information without using an ID and password in an on-line environment.

The fingerprint recognition module 100 on the path for fingerprint recognition starting has been described above with regard to the path for fingerprint recognition payment.

The authentication controller 152, which is an Identity Authentication Unit (IAU), may receive a result of fingerprint recognition, that is, a result of a success/failure of fingerprint authentication from the fingerprint recognition module 100, and transfer the result of the success/failure of fingerprint authentication to the body controller 154. The body controller 154, which is an Integrated Body control Unit (IBU), may receive the result of the success/failure of fingerprint authentication from the authentication controller 152 and transfer the result of the success/failure of fingerprint authentication to the start button 156.

The start button 156 may be activated only when a result of a fingerprint authentication success is received from the body controller 154, to respond to a control of the user 128.

Also, when an interrupt with another authentication means except for the fingerprint recognition module 100 occurs, the authentication controller 152 may output a warning message through the AVN 124 or a cluster.

The start button 156 will be described in further detail below. The start button 156 may have operation modes of LOCK(B+), ACC, ON (IG ON), and START (ignition on). More specifically, power supply modes of the vehicle may be operation modes of LOCK(B+), ACC, ON (IG ON), and START (ignition on) according to a control of the start button 156.

The operation mode LOCK may be a state of when the user 128 does not press the start button 156 after riding in the vehicle while possessing a key FOB. Also, when the user 128 presses the start button 156 once more in the operation mode ON that will be described later, the operation mode ON may be converted to the operation mode LOCK. In the operation mode LOCK, the engine 158 may be in an ignition-off state, and a steering wheel may be in a locked state.

The operation mode ACC, which is also referred to as ACC ON, may be a state of when the user 128 presses the start button 156 one time in the operation mode LOCK without pressing a brake pedal. In the operation mode ACC, the user 128 may use some convenience devices, such as the AVN 124 or air conditioner of the vehicle, by using power of a battery.

The operation mode ON, which is also referred to as IG ON, may be a state of when the user 128 presses the start button 156 two times in the operation mode LOCK without pressing the brake pedal or when the user 128 presses the start button 156 one time in the operation mode ACC without pressing the brake pedal. In the operation mode ON, the user 128 may use all electrical devices of the vehicle. That is, in the operation mode ON, an instrument panel may light on, all electronic controllers ECUs of the vehicle may be activated, and various devices of the vehicle may be tested.

The operation mode START may be a state of when the user 128 presses the start button 156 while pressing the brake pedal regardless of which state the start button 156 is currently in so that the engine starts. In most vehicles, when the start button 156 is pressed while the brake pedal is pressed in a parking mode P or a neural mode N of a transmission lever, the ignition of the engine 158 may be turned on. Accordingly, in an embodiment of the disclosure, pressing the start button 156 while pressing the brake pedal may be performed on the assumption that the transmission lever is set to the parking mode P or the neutral mode P.

The operation modes of the start button 156 may be to differentiate power supply to the vehicle. Power supply ranges may be differentially applied according to the operation modes of the start button 156 as described above. The vehicle may have a power supply mode referred to as 'B+' or 'regular power', in addition to power supply by a control of the start button 156. B+, that is, regular power may be power that is always (regularly) supplied in a charged state of the battery, regardless of whether the start button 156 is pressed. Through regular power supply of B+, lamps of the vehicle, such as a room lamp or a door lamp, may be turned on, or a drive recorder (so-called a black box) may operate. In the operation mode LOCK as described above, B+, that is, regular power may be supplied. In the embodiment of the disclosure, a state in which B+, that is, regular power is supplied is referred to as a B+ mode.

The operation modes LOCK(B+), ACC, ON (IG ON), and START (ignition on) may also be respectively referred to as a first mode, a second mode, a third mode, and a fourth mode.

In an embodiment of the disclosure, authentication for fingerprint recognition starting may be activated in the operation modes B+, ACC, and ON (IG ON), and, when the start button 156 is pressed within a preset time period (for example, 30 seconds) after fingerprint authentication, mode conversion may be performed. Also, according to an embodiment of the disclosure, authentication (service interworking authentication) for fingerprint recognition payment may be activated when a request from the AVN 124 is issued in the operation modes ACC, ON (IG ON), and START. That is, in the operation mode B+, no fingerprint recognition payment may be activated.

Also, according to an embodiment of the disclosure, a result of fingerprint recognition (authentication) performed one time may be not used for both fingerprint recognition payment and fingerprint recognition starting. That is, a result of fingerprint recognition (authentication) performed one time may be used for any one of fingerprint recognition payment or fingerprint recognition starting. When a result of fingerprint recognition (authentication) performed one time is used for fingerprint recognition payment, fingerprint recognition (authentication) may need to be performed once more for fingerprint recognition starting.

In this case, a preset priority may be applied. When a request for service interworking authentication and a request for fingerprint recognition starting are issued at the same time, service interworking authentication may be first performed, and then authentication for fingerprint recognition starting may be performed. More specifically, when a request for service interworking authentication is issued in a standby state for authentication for fingerprint recognition starting, service interworking authentication may be first performed, and then the standby state for fingerprint recognition starting authentication may be returned.

For example, when a request for AVN interworking authentication (service interworking authentication), such as fingerprint recognition payment or user login, is issued in a fingerprint authentication standby state for fingerprint recognition starting, AVN interworking authentication (service interworking authentication) may be first processed, and then the fingerprint authentication standby state for fingerprint recognition starting may be returned.

Service interworking authentication may be authentication related to various services that the user 128 can use in the vehicle. AVN interworking authentication, which is one kind of service interworking authentication, may be fingerprint authentication for a task, such as fingerprint recognition payment or user login, requiring collaboration of the AVN 124 and the fingerprint recognition module 100.

When a request for AVN interworking authentication is issued, a result of a success/failure of fingerprint authentication may be transferred from the fingerprint recognition module 100 to the AVN 124. Unlike this, when fingerprint authentication for fingerprint recognition starting is processed, a result of a success/failure of fingerprint authentication may be transferred from the fingerprint recognition module 100 to the authentication controller 152.

When fingerprint authentication for fingerprint recognition starting is in a limited state, a touch of the user 128 on the fingerprint sensor 102 may cause no fingerprint recognition although the touch is detected, and accordingly, no result of fingerprint recognition may be transmitted to the authentication controller 152.

When fingerprint authentication for AVN interworking authentication is in a limited state, the AVN 124 may not request the fingerprint recognition module 100 to perform fingerprint authentication. That is, in this case, a touch of the user 128 on the fingerprint sensor 102 may cause no fingerprint recognition (authentication), and accordingly, no result of fingerprint recognition (authentication) may be transmitted to the authentication controller 152.

Figure 2:
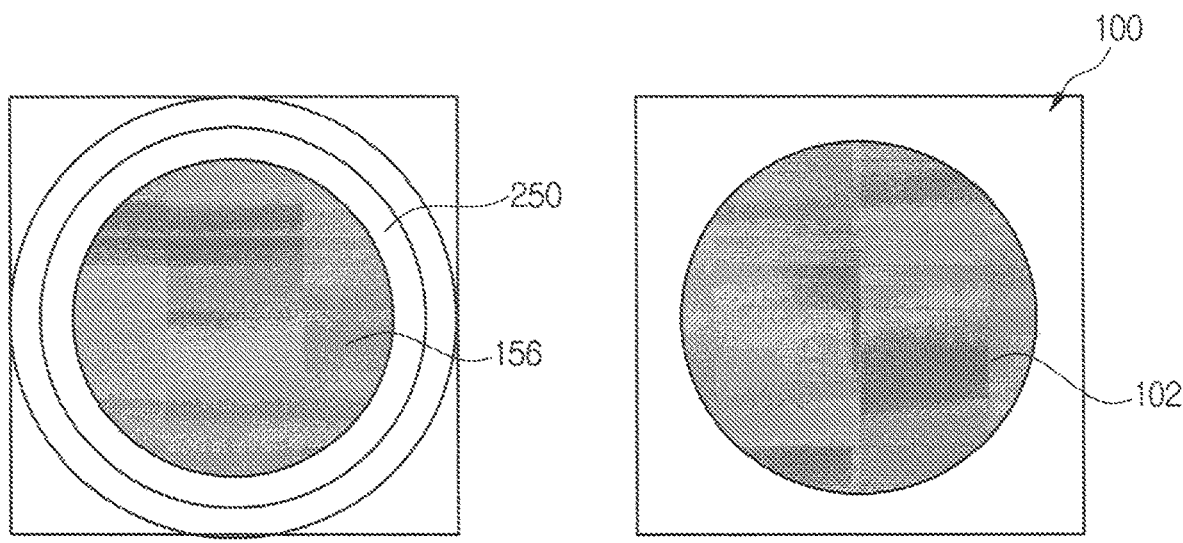
FIG. 2 shows a start button and a fingerprint recognition module of a vehicle according to an embodiment of the disclosure.

FIG. 2 shows a start button and a fingerprint recognition module of a vehicle according to an embodiment of the disclosure.

As shown in FIG. 2, whenever the user 128 presses the start button 156 with his/her finger, mode conversion of ACC—ON (IG ON)—START may be performed.

In FIG. 2, a reference numeral 250 may indicate a LED light. The LED light 250 may be provided to differentially represent a fingerprint recognition state or a power mode (ACC/ON(IG ON)/START) state with a color or a turned-on/off state. The LED light 250 may also be provided in the fingerprint recognition module 100 to be used for the same purpose, which is not shown in FIG. 2.

The fingerprint recognition module 100 may include the fingerprint sensor 102. When the user 129 contacts the fingerprint sensor 102 with his/her finger, the fingerprint sensor 102 may recognize a fingerprint of the finger.

Figure 3A:
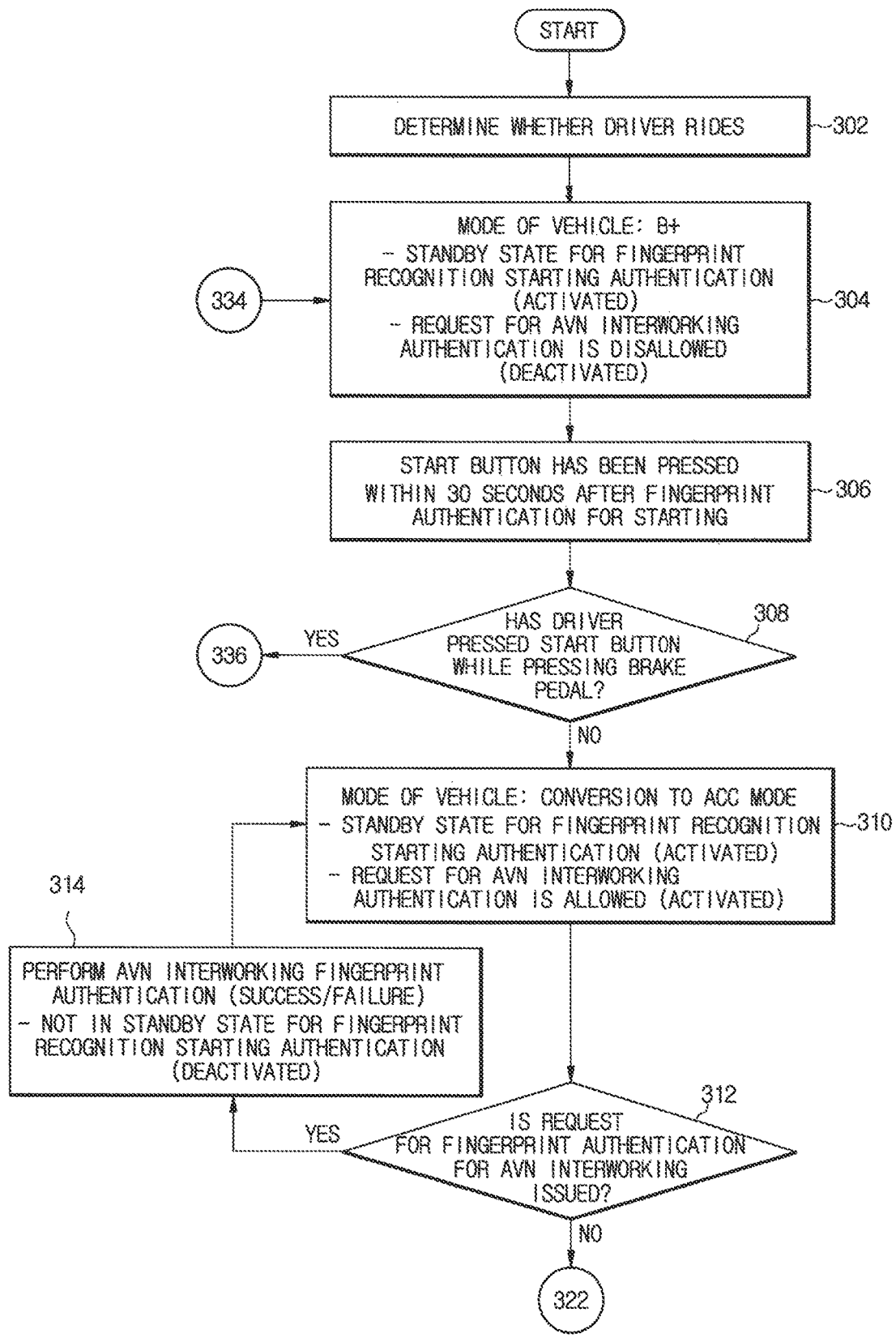
FIG. 3A shows a fingerprint recognition method of a vehicle according to an embodiment of the disclosure.
Figure 3B:
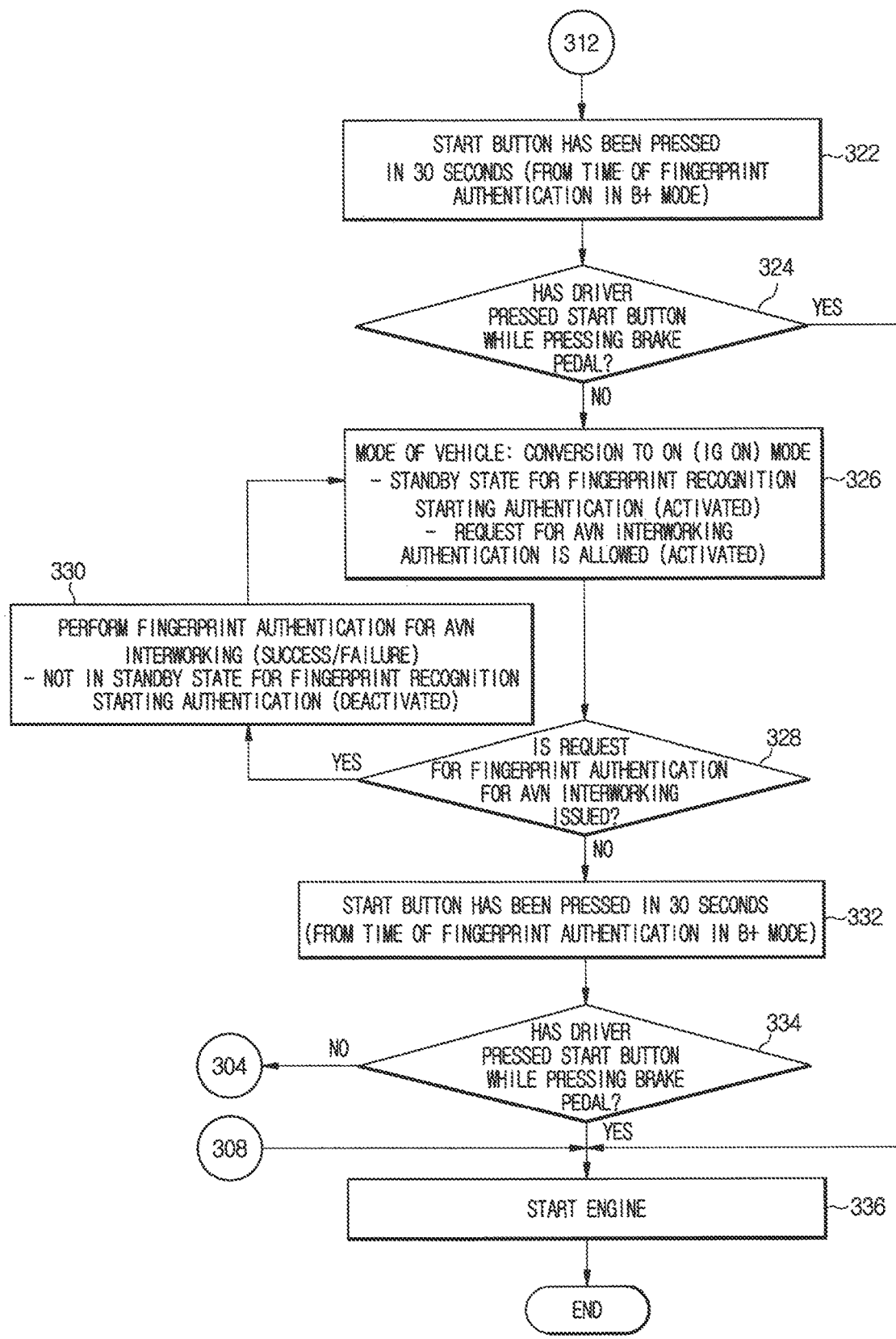
FIG. 3B shows a fingerprint recognition method of a vehicle according to an embodiment of the disclosure.

FIGS. 3a and 3b shows a fingerprint recognition method of a vehicle according to an embodiment of the disclosure. After operation 312 of FIG. 3a, operation 322 of FIG. 3b may be performed. According to the fingerprint recognition method of the vehicle as shown in FIG. 3, in a B+ mode after the user 128 rides in the vehicle, fingerprint authentication for fingerprint recognition starting may be activated, whereas fingerprint authentication (that is, AVN interworking authentication) for fingerprint recognition payment may be deactivated. Also, when the B+ mode is converted to an ACC mode, both fingerprint authentication for fingerprint recognition starting and fingerprint authentication (that is, AVN interworking authentication) for fingerprint recognition payment may be activated. Also, when the ACC mode is converted to an ON (IG ON) mode, both fingerprint authentication for fingerprint recognition starting and fingerprint authentication (that is, AVN interworking authentication) for fingerprint recognition payment may be activated. Also, when the engine is in an ignition-on state, fingerprint authentication for fingerprint recognition starting may be deactivated, and only fingerprint authentication (that is, AVN interworking authentication) for fingerprint recognition payment may be activated.

As shown in FIG. 3, whether the user 128 rides in the vehicle may be determined, in operation 302. Whether the user 128 rides in the vehicle may be determined based on a detection of a door signal that is generated when a door is opened or closed.

After the user 128 rides in the vehicle, a power supply mode of the vehicle may be the B+ mode, in operation 304. In the B+ mode, fingerprint authentication for fingerprint recognition starting may wait in an activated state, and fingerprint authentication for AVN interworking may be deactivated to be unavailable. When the user 128 performs fingerprint authentication for fingerprint recognition starting, a result of the fingerprint authentication for fingerprint recognition starting may be transmitted to the body controller 154 via the authentication controller 152 only when the fingerprint authentication is successful. Starting the engine 158 through a control (pressing) of the start button 156 may be possible only after a result (success) of fingerprint authentication for fingerprint recognition starting is transmitted to the body controller 154.

In the B+ mode, when the user 128 has pressed the start button 156 within a preset time period (for example, 30 seconds) after the fingerprint authentication for fingerprint recognition starting, in operation 306, whether the user 128 has pressed the start button 156 while pressing the brake pedal of the vehicle may be determined, in operation 308.

When the user 128 has pressed the start button 156 while pressing the brake pedal of the vehicle ('YES' in operation 308), the process may proceed to operation 336 of engine START (ignition on) of FIG. 3b, which will be described later, to start the engine 158.

In contrast, when the user 128 has pressed the start button 156 without pressing the brake pedal of the vehicle ('NO' in operation 308), the B+ mode may be converted to the ACC mode, in operation 310. In the ACC mode, fingerprint authentication for fingerprint recognition starting may wait in an activated state, and fingerprint recognition for AVN interworking may be also activated to be available.

In the ACC mode, when a request for AVN interworking fingerprint authentication is issued ('YES' in operation 312), fingerprint recognition and authentication for AVN interworking may be performed, in operation 314. A result (success or failure) of the fingerprint recognition and authentication for AVN interworking may be transmitted from the fingerprint recognition module 100 to the AVN 124. Because this state is a process of performing fingerprint authentication for AVN interworking, authentication for fingerprint recognition starting may be not activated.

When no request for fingerprint authentication for AVN interworking is issued ('NO' in operation 312) in the ACC mode of operation 312, whether the user 128 has pressed the start button 156 within a preset time period may be determined, in operation 322. The preset time period may be, for example, 30 seconds from time of fingerprint authentication in the B+ mode of operation 306 described above in FIG. 3a.

When it is determined that the user 128 has pressed the start button 156 while pressing the brake pedal in operation 322 ('YES' in operation 324), the process may proceed to operation 336 of engine START (ignition on) to start the engine 158.

In contrast, when it is determined that the user 128 has pressed the start button 156 without pressing the brake pedal in operation 322 ('NO' in operation 324), the ACC mode may be converted to an ON mode, in operation 326. In the ON (IG ON) mode, fingerprint authentication for fingerprint recognition starting may wait in an activated state, and fingerprint authentication for AVN interworking may also be activated to be available.

When a request for fingerprint authentication for AVN interworking is issued in the ON (IG ON) mode ('YES' in operation 328), fingerprint recognition and authentication for AVN interworking may be performed, in operation 330. A result (success or failure) of the fingerprint recognition and authentication for AVN interworking may be transmitted from the fingerprint recognition module 100 to the AVN 124. Because this state is a process of performing fingerprint authentication for AVN interworking, authentication for fingerprint recognition starting may be not activated.

When no request for fingerprint authentication for AVN interworking is issued in the ON (IG ON) mode ('NO' in operation 328), whether the user 128 has pressed the start button 156 within a preset time period may be determined, in operation 332. The preset time period may be, for example, 30 seconds from time of fingerprint authentication in the B+ mode of operation 306 described above with reference to FIG. 3a.

When it is determined that the user 128 has pressed the start button 156 without pressing the brake pedal in operation 332 ('NO' in operation 334), the ON (IG ON) mode may be converted to the B+ mode (or LOCK mode) of operation 304 of FIG. 3a as described above.

In contrast, when it is determined that the user 128 has pressed the start button 156 while pressing the brake pedal in operation 332 ('YES' in operation 334), the process may proceed to operation 336 of engine START (ignition on) to start the engine 158. That is, fingerprint authentication has been performed in the B+ mode of operation 306 of FIG. 3a, and when the fingerprint authentication is not authentication for AVN interworking, the fingerprint authentication may be determined to be authentication for fingerprint recognition starting. Therefore, when the user 128 presses the start button 156 while pressing the brake pedal within 30 seconds after fingerprint authentication in the B+ mode, the engine 158 may start.

FIG. 4 shows various embodiments of guidance messages that are output in fingerprint authentication and related operations of a vehicle according to an embodiment of the disclosure. The guidance messages shown in FIG. 4 may be visually output through the AVN 124 or a display of the cluster, or may be output in the form of voice guidance through a speaker inside the vehicle.

CASE #1: a guidance message such as "press the start button in 30 seconds to start" may be output within a preset time period (for example, 30 seconds) after fingerprint authentication for fingerprint recognition starting. Through the guidance message, the user 128 may recognize that fingerprint authentication for engine starting has been successfully completed and the engine 158 can start by pressing the start button 156.

CASE #2: when the user 128 presses the start button 156 without possessing a smart key in the B+ mode, a guidance message such as "smart key, digital key, or fingerprint is not recognized" may be output. This case may be a case in which a setting for starting the engine 158 only with a smart key or a digital key without having to perform fingerprint authentication has been made.

CASE #3: when the user 128 presses the start button 156 once more in the situation of CASE #2, guidance messages, such as "directly press the start button with the smart key" and "authenticate the digital key or authenticate with the registered fingerprint", may be output alternately. This case may be a case in which a setting for starting the engine 158 through a combination of a digital key and fingerprint authentication has been made.

CASE #4: when the user 128 presses the start button 156 once more in the situation of CASE #2, a guidance message such as "press the start button after authenticating the registered fingerprint" may be output. Through the guidance message, the user 128 may recognize that fingerprint authentication is required to start the engine 158.

CASE #5: when conversion to a normal start mode occurs after the engine 158 starts through remote starting, a guidance message such as "the engine will be off after a while. Please authenticate your fingerprint" may be output. Through the guidance message, the user 128 may recognize that the engine 158 is turned off and fingerprint authentication is required for conversion from a remote start mode to the normal start mode.

CASE #6: when the user 128 touches the fingerprint sensor 102 after fingerprint recognition (authentication)

through the fingerprint recognition module 100 is limited, a guidance message such as "limited fingerprint authentication, please try again after a minute" may be output. Through the guidance message, the user 128 may recognize that fingerprint authentication of the fingerprint recognition module 100 is currently in a limited state. In this case, the fingerprint recognition module 100 may perform no fingerprint recognition, although the fingerprint recognition module 100 recognizes that the user 128 contacts the fingerprint sensor 102 with his/her finger.

CASE #7: after fingerprint recognition (authentication) is successfully performed, a guidance message such as "successful authentication. You can start the engine" may be output. Through the guidance message, the user 128 may recognize that fingerprint authentication is successful and the engine 158 can start.

An aspect of the disclosure is aimed to enable a user to start the engine and use various services by more conveniently performing user authentication through concretization of a fingerprint authentication process.

The above descriptions are only examples of the technical spirit, so a person skilled in the art may implement various corrections, modifications, and substitutions without departing from the intrinsic characteristics. Thus, the embodiments and drawings disclosed herein are intended not to limit but to describe the technical spirit. The scope of the technical sprit is not limited to the embodiments and drawings. The protective scope is defined by the appended claims, and all technical spirits within the equivalent scope are construed as being included in the scope of the right.

What is claimed is:

1. A vehicle comprising:
a start button configured to start an engine; and
a fingerprint recognition module including a fingerprint sensor configured to recognize a user's fingerprint for fingerprint authentication, the fingerprint recognition module configured to perform service interworking authentication for using a service provided in the vehicle and fingerprint recognition starting authentication for starting the engine, and preferentially process the service interworking authentication when a request for the service interworking authentication and a request for the fingerprint recognition starting authentication are issued at the same time,
wherein,
when a power supply mode of the vehicle is converted to a second mode ACC or a third mode ON by a control of the start button, both the service interworking authentication and the fingerprint recognition starting authentication are activated, and
when a request for the service interworking authentication is issued while the power supply mode of the vehicle is converted to the second mode ACC or the third mode ON, the fingerprint recognition module performs the service interworking authentication and deactivates the fingerprint recognition starting authentication, in response to the request for the service interworking authentication.

2. The vehicle of claim 1, wherein, when a request for the service interworking authentication is issued in a standby state for the fingerprint recognition starting authentication, the fingerprint recognition module first performs the service interworking authentication and then returns to the standby state for the fingerprint recognition starting authentication.

3. The vehicle of claim 1, wherein the service interworking authentication is authentication for performing personalized profile interworking in the vehicle.

4. The vehicle of claim 1, wherein the service interworking authentication is authentication for performing a valet mode release in the vehicle.

5. The vehicle of claim 1, wherein the service interworking authentication is authentication for performing payment for electronic commerce in the vehicle.

6. The vehicle of claim 1, wherein the fingerprint recognition module transmits a result of a success/failure of fingerprint authentication for the service interworking authentication to a multimedia device of the vehicle, and transmits a result of a success of fingerprint authentication for the fingerprint recognition starting authentication to an authentication controller of the vehicle.

7. The vehicle of claim 1, wherein, when a power supply mode of the vehicle is converted to a first mode B+ by a control of the start button, the fingerprint recognition starting authentication is activated and the service interworking authentication is deactivated.

8. The vehicle of claim 1, wherein, when a power supply mode of the vehicle is converted to a fourth mode START by a control of the start button, the service interworking authentication is activated and the fingerprint recognition starting authentication is deactivated.

9. A fingerprint authentication method of a vehicle, the vehicle including a start button configured to start an engine, and a fingerprint recognition module including a fingerprint sensor configured to recognize a user's fingerprint for fingerprint authentication, the fingerprint authentication method comprising:
preferentially performing service interworking authentication for using a service provided in the vehicle and fingerprint recognition starting authentication for starting the engine; and
processing the service interworking authentication when a request for the service interworking authentication and a request for the fingerprint recognition starting authentication are issued at the same time,
wherein,
when a power supply mode of the vehicle is converted to a second mode ACC or a third mode ON by a control of the start button, both the service interworking authentication and the fingerprint recognition starting authentication are activated, and
when a request for the service interworking authentication is issued while the power supply mode of the vehicle is converted to the second mode ACC or the third mode ON, the service interworking authentication is performed and the fingerprint recognition starting authentication is deactivated, in response to the request for the service interworking authentication.

10. The fingerprint authentication method of claim 9, further comprising, when a request for the service interworking authentication is issued in a standby state for the fingerprint recognition starting authentication, first performing the service interworking authentication and then returning to the standby state for the fingerprint recognition starting authentication.

11. The fingerprint authentication method of claim 9, wherein the service interworking authentication is authentication for performing personalized profile interworking in the vehicle.

12. The fingerprint authentication method of claim 9, wherein the service interworking authentication is authentication for performing a valet mode release in the vehicle.

13. The fingerprint authentication method of claim 9, wherein the service interworking authentication is authentication for performing payment for electronic commerce in the vehicle.

14. The fingerprint authentication method of claim 9, further comprising:
   transmitting a result of a success/failure of fingerprint authentication for the service interworking authentication to a multimedia device of the vehicle; and
   transmitting a result of a success of fingerprint authentication for the fingerprint recognition starting authentication to an authentication controller of the vehicle.

15. The fingerprint authentication method of claim 9, further comprising, when a power supply mode of the vehicle is converted to a first mode B+ by a control of the start button, activating the fingerprint recognition starting authentication and deactivating the service interworking authentication.

16. The fingerprint authentication method of claim 9, further comprising, when a power supply mode of the vehicle is converted to a fourth mode START by a control of the start button, activating the service interworking authentication and deactivating the fingerprint recognition starting authentication.

* * * * *